(12) United States Patent
Jeon

(10) Patent No.: US 11,424,496 B2
(45) Date of Patent: Aug. 23, 2022

(54) BATTERY MODULE

(71) Applicants: Hyundai Motor Company, Seoul (KR); Kia Motors Corporation, Seoul (KR)

(72) Inventor: Yoon Cheol Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 16/996,005

(22) Filed: Aug. 18, 2020

(65) Prior Publication Data
US 2021/0328285 A1  Oct. 21, 2021

(30) Foreign Application Priority Data

Apr. 21, 2020 (KR) .......................... 10-2020-0047837

(51) Int. Cl.
| | |
|---|---|
| *H01M 10/6551* | (2014.01) |
| *H01M 10/625* | (2014.01) |
| *H01M 10/613* | (2014.01) |
| *H01M 10/42* | (2006.01) |
| *H01M 10/6555* | (2014.01) |
| *H01M 50/20* | (2021.01) |
| *H01M 50/528* | (2021.01) |

(52) U.S. Cl.
CPC ..... *H01M 10/6551* (2015.04); *H01M 10/425* (2013.01); *H01M 10/613* (2015.04); *H01M 10/625* (2015.04); *H01M 10/6555* (2015.04); *H01M 50/20* (2021.01); *H01M 50/528* (2021.01)

(58) Field of Classification Search
None
See application file for complete search history.

(56) References Cited

U.S. PATENT DOCUMENTS

| | | | | |
|---|---|---|---|---|
| 8,034,476 B2* | 10/2011 | Ha | ....................... | H01M 50/502 |
| | | | | 429/151 |
| 2018/0076487 A1* | 3/2018 | Lee | ........................ | H01M 10/48 |
| 2018/0301674 A1* | 10/2018 | Lee | ........................ | H01M 50/20 |
| 2018/0337384 A1* | 11/2018 | Volinski | ................ | H01M 50/15 |
| 2020/0295337 A1* | 9/2020 | You | ........................ | H01M 50/50 |

FOREIGN PATENT DOCUMENTS

KR    10-2022590 B1    9/2019

* cited by examiner

*Primary Examiner* — Alix E Eggerding
(74) *Attorney, Agent, or Firm* — Fox Rothschild LLP

(57) ABSTRACT

A battery module having a plurality of stacked battery module units is provided. The battery module unit includes a cooling fin in which an interval between two cooling plates facing each other is expandable and contractible. A battery cell is in contact with each of the two cooling plates and having lead tabs at each end. Protruding steps extend from both ends of the cooling plates to maximize a contact area with the lead tabs of the battery cell. Lead tab fasteners are coupled to the protruding steps to fix the lead tabs of the battery cell to the protruding steps. The lead tap fasteners include connecting grooves and connecting protrusions relative to each other to be coupled by a linear relative movement with lead tap fasteners of an adjacent battery module unit.

13 Claims, 6 Drawing Sheets

BATTERY MODULE

CROSS REFERENCE TO RELATED APPLICATION

The present application claims priority to Korean Patent Application No. 10-2020-0047837, filed Apr. 21, 2020, the entire contents of which is incorporated herein for all purposes by this reference.

BACKGROUND

1. Technical Field

The present disclosure relates to a battery module, and more particularly, to a structure of a battery module mounted within a hybrid vehicle or an electric vehicle.

2. Description of the Related Art

For a battery module constructed by stacking a plurality of battery cells, a lead tab, which is an electrode of each battery cell, requires cooling together with a body of the battery cell, as a main heat generating portion. Thus, structural configurations are important to properly absorb a swelling phenomenon of each battery cell, and assemblability capable of easily and safely constructing the battery module is required.

The contents described as the related art have been provided merely to assist in understanding the background of the present disclosure and should not be considered as corresponding to the related art known to those having ordinary skill in the art.

SUMMARY

An object of the present disclosure is to provide a battery module having simplified and safe assemblability capable of smoothly cooling a lead tab, which is a main heat generating portion, together with a body of a battery cell, securing structural stability of the battery module by properly absorbing a swelling phenomenon of the battery cell, and constructing the battery module by more easily and safely coupling a plurality of battery cells.

According to an exemplary embodiment of the present disclosure, a battery module includes: a plurality of stacked battery module units, the battery module unit may include a cooling fin in which an interval between two cooling plates facing each other is expandable and contractible; a battery cell in contact with each of the two cooling plates and having lead tabs at both ends; protruding steps that extend from both ends of the cooling plates to maximize a contact area with the lead tabs of the battery cell; and lead tab fasteners coupled to the protruding steps to fix the lead tabs of the battery cell to the protruding steps. The lead tap fasteners may include connecting grooves and connecting protrusions relative to each other to be coupled by a linear relative movement with lead tap fasteners of an adjacent battery module unit.

The cooling fin may be formed in a U-shaped cross-sectional structure formed by connecting first ends of the two cooling plates to each other. A deformation absorbing material that elastically contracts and expands when the interval between the two cooling plates is expanded and contracted may be inserted between the two cooling plates of the cooling fin. Coupling grooves and coupling protrusions may be provided relative to each other between the lead tab fasteners and the protruding steps to press and couple the lead tap fasteners to the protruding steps.

The coupling grooves and the coupling protrusions may be formed to be pressed and coupled along a direction in which the battery module units overlap, and the connecting grooves and the connecting protrusions may be configured to be fitted and coupled by the linear relative movement along a direction perpendicular to the direction in which the battery module units overlap. The lead tab fasteners of the plurality of battery module units overlapped to form the battery module may be provided with apertures through which support bars may be inserted through the battery module, end plates may be provided at both side ends of the battery module, and fastening elements that penetrate through the end plates and are coupled to the support bars to integrally fix the battery module may be provided.

A sensing assembly configured to sense a voltage of each battery cell may be installed at a portion where the lead tabs of the battery module are aligned. The sensing assembly may include: a plurality of cell connecting plates that connect between the lead tabs of the battery cells; a plurality of insulating blocks structurally providing electrical insulation between the plurality of cell connecting plates; and a printed circuit board (PCB) connected to the cell connecting plates to sense the voltages of the battery cells.

The cell connecting plates may include lead tab inserting apertures into which the lead tabs of two adjacent battery cells are inserted, and block coupling apertures for being coupled to the insulating blocks; and the insulating blocks may include connecting plate fixing protrusions into which the block coupling apertures are inserted to fix the cell connecting plates. Sensing protrusions formed to be inserted into the PCB may be integrally formed on the cell connecting plates to electrically and mechanically connect the cell connecting plates to the PCB. The insulating blocks may include free protrusion ends that freely set a height protruding between two adjacent cell connecting plates.

The plurality of cell connecting plates may be formed to connect the lead tabs of two battery cells adjacent to each other, the plurality of insulating blocks may be disposed along a stacking direction of the battery module units while having the plurality of cell connecting plates interposed therebetween, first ends of the insulating blocks may be assembled to maintain a constant interval from each other by a frame plate, and second ends of the insulating blocks may be assembled to maintain a constant interval from each other by the PCB. The cell connecting plates may include lead tab inserting apertures into which two lead tabs of the battery cells of two battery module units adjacent to each other are respectively inserted, and the lead tabs of the battery cell disposed on the outermost side of the battery module may be inserted into module connecting plates that are electrically connected to other battery modules.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
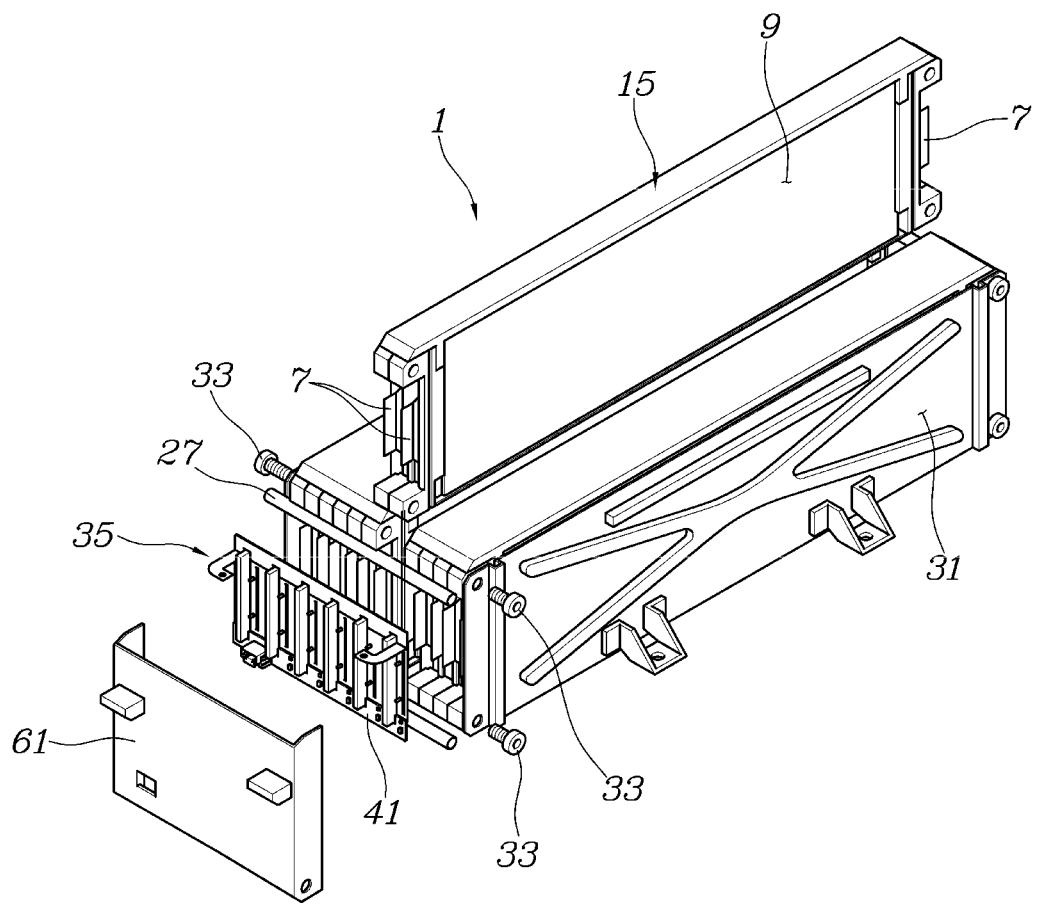
FIG. 1 is a view illustrating an exemplary embodiment of a battery module according to the present disclosure.
Figure 2:
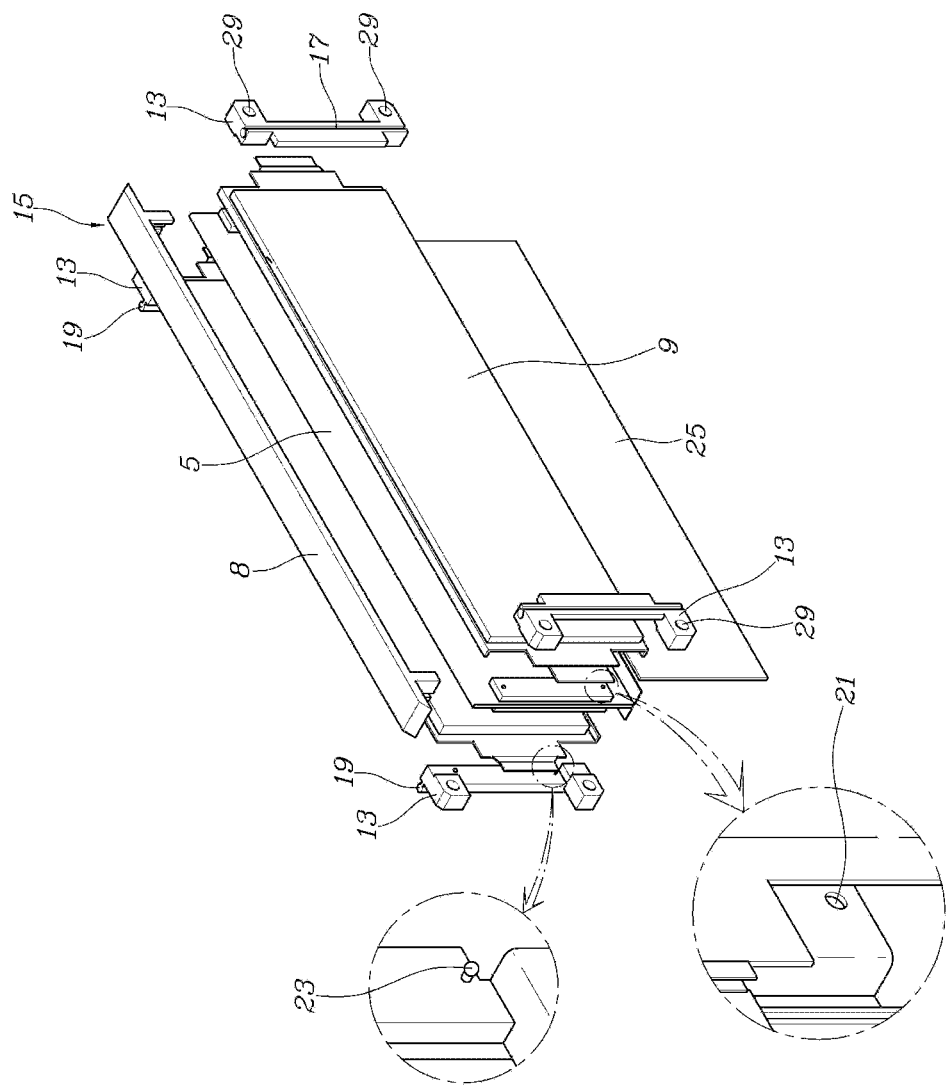
FIG. 2 is a view describing a configuration of a battery module unit forming the battery module of FIG. 1 according to the present disclosure.
Figure 3:
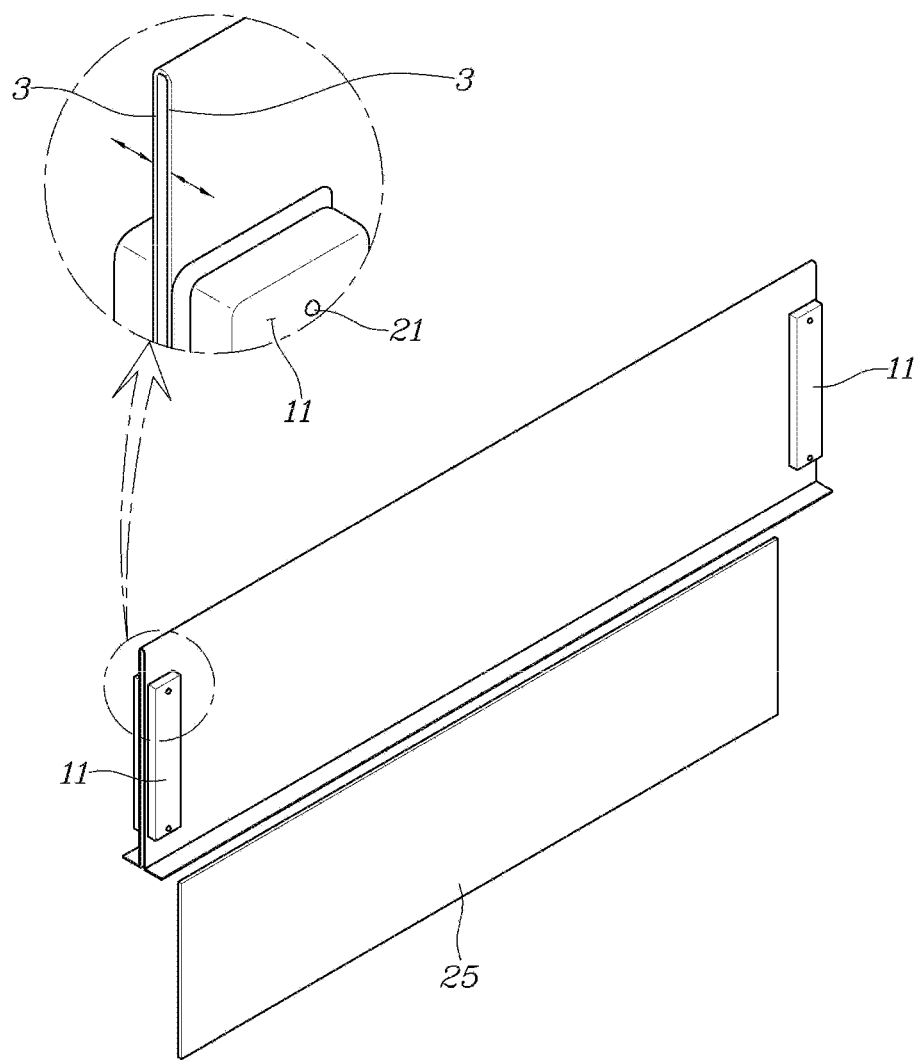
FIG. 3 is a view illustrating in detail a structure of a cooling fin of each battery module unit according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIGS. 1 to 5, a battery module 1 according to an exemplary embodiment of the present disclosure includes a plurality of stacked battery module units 15, the battery module unit 15 may include a cooling fin 5 in which an interval between two cooling plates 3 facing each other is expandable and contractible; a battery cell 9 in contact with each of the two cooling plates 3 and having lead tabs 7 at both ends; protruding steps 11 extending from both ends of the cooling plates 3 to maximize a contact area with the lead tabs 7 of the battery cell 9; and lead tab fasteners 13 coupled to the protruding steps 11 to fix the lead tabs 7 of the battery cell 9 to the protruding steps 11. The lead tap fasteners 13 may include connecting grooves 17 and connecting protrusions 19 relative to each other to be coupled by a linear relative movement with lead tap fasteners 13 of an adjacent battery module unit 15.

Figure 4:
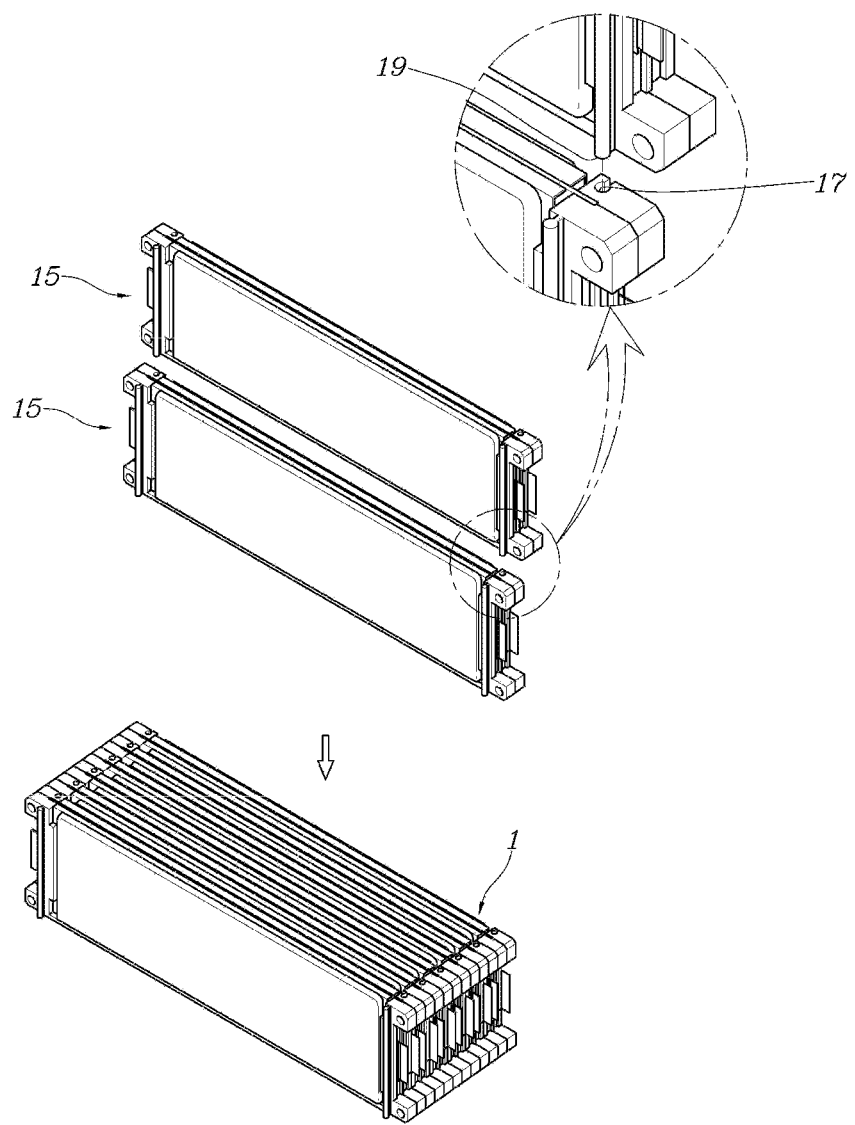
FIG. 4 is a view describing that the battery module is constituted by linear relative movement and coupling of the battery modules according to the present disclosure.
Figure 5:
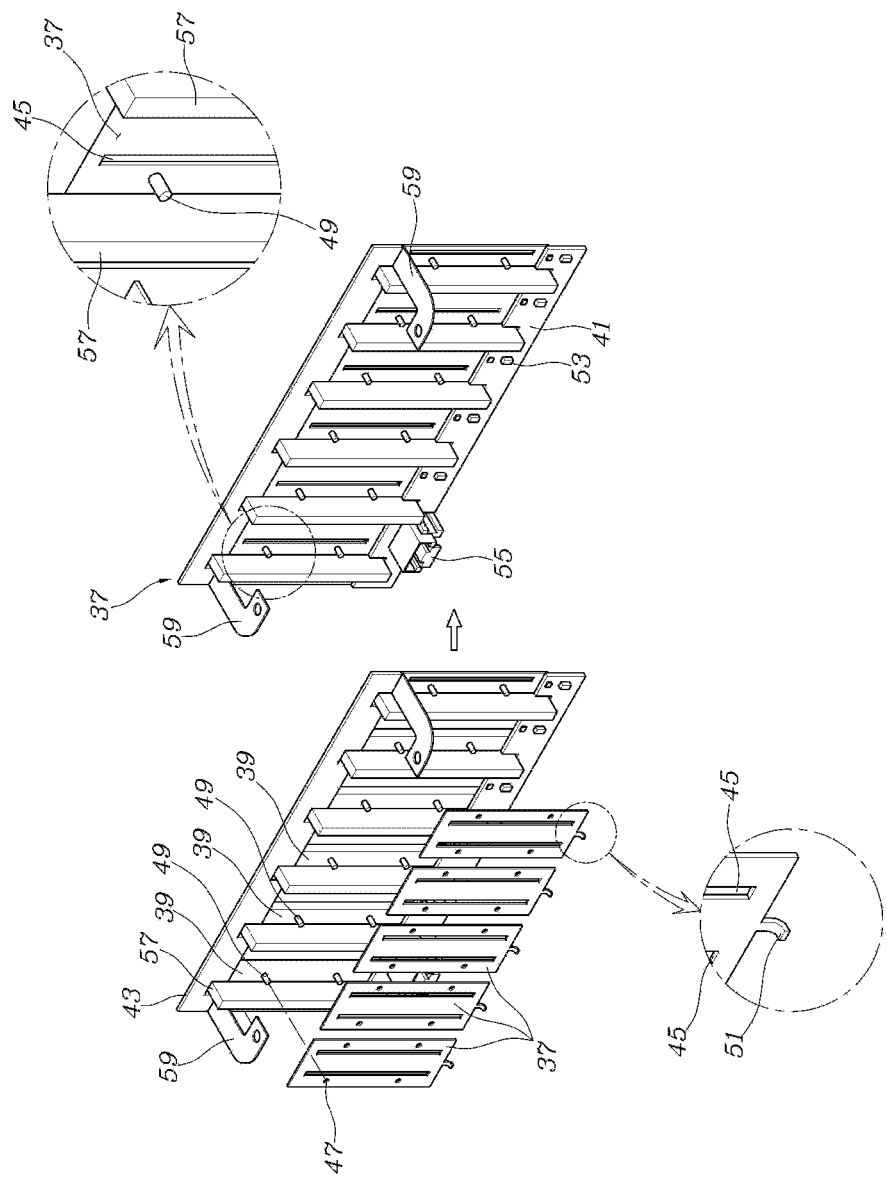
FIG. 5 is a view describing an assembly structure of a sensing assembly of FIG. 1 according to the present disclosure.

In other words, the battery module 1 according to the present disclosure is configured by stacking the plurality of battery module units 15 in one direction, as illustrated in FIGS. 1 and 4, and the connection between these battery module units 15 is configured to be formed by the connecting grooves 17 and the connecting protrusions 19 provided in the lead tap fasteners 13. In addition, coupling grooves 21 and coupling protrusions 23 may be disposed relative to each other between the lead tab fasteners 13 and the protruding steps 11 to couple the lead tab fasteners 13 to the protruding steps 11 while adhering the lead tabs 7 of the battery cell 9 to the protruding steps 11, for the lead tap fasteners 13 being pressed toward the protruding steps 11.

In other words, as in the present exemplary embodiment, when the coupling grooves 21 are formed in the protruding steps 11, the coupling protrusions 23 may be provided on the lead tab fastener 13, and conversely, when the coupling grooves 21 are formed in the lead tap fasteners 13, the coupling protrusions 23 may be provided on the protruding steps 11. The lead tab fasteners 13 may be made of an insulating material.

Each battery module unit 15 may be assembled by pressing the lead tab fasteners 13 of the insulating material to the protruding steps 11 of the cooling fin 5 to allow the coupling grooves 21 and the coupling protrusions 23 to be coupled to each other, and the coupling between the battery module units 15 may be achieved by coupling the connecting grooves 17 and the connecting protrusions 19. As a result, in assembling the battery module 1, it may be possible to safely assemble the battery module 1 by the coupling and connecting structures provided in the lead tab fasteners 13 of the insulating material without using a metal tool, thereby significantly reducing the possibility of a safety accident when assembling the battery module 1.

Particularly, the coupling grooves 21 and the coupling protrusions 23 may be formed to be pressed and coupled along a direction in which the battery module units 15 overlap, and the connecting grooves 17 and the connecting protrusions 19 may be fitted and coupled by a linear relative movement of the battery module units 15 to be coupled along a direction perpendicular to the direction in which the battery module units 15 overlap. Therefore, the connecting grooves 17 and the connecting protrusions 19 may be coupled and separated independently from the connection and separation of the coupling grooves 21 and the coupling protrusions 23.

In other words, when a force is applied for coupling or separation of the connecting grooves 17 and the connecting protrusions 19, the coupling grooves 21 and the coupling protrusions 23 may stably maintain a coupled state regardless of an influence of such a force. As a result, the assembly and separation of the battery module 1 may be simplified. The cooling fin 5 may be formed in a U-shaped cross-sectional structure formed by connecting first ends of the two cooling plates 3 to each other as illustrated in detail in FIG. 3, and as portions where the cooling plates 3 are connected to each other are elastically deformed, an interval between the two cooling plates 3 is expandable and contractible when the swelling phenomenon of the battery cells 9 occurs.

In other words, the two cooling plates 3 of the cooling fin 5 may absorb the swelling phenomenon occurring in the battery cells 9 while expanding and contracting the interval therebetween. Therefore, it may be possible improve stability of the battery module 1. In addition, a deformation absorbing material 25 that elastically contracts and expands when the interval between the two cooling plates 3 is expanded and contracted may be inserted between the two cooling plates 3 of the cooling fin 5 to allow or suppress the swelling phenomenon of the battery cells 9 to an appropriate level. As the deformation absorbing material 25, a plate-like member made of a foam material may be used.

The protruding steps 11 of the cooling plates 3 may be formed in a shape that extends from the cooling fin 5 to secure a close contact state that maximizes a contact area with the lead tabs 7 of the battery cell 9, and may secure a more reliable and effective cooling performance for portions where the lead tabs 7 where the most heat is generated in the battery cell 9 are located. For reference, in the present exemplary embodiment, each battery module unit 15 may include a unit cover 8 that surrounds the cooling fin 5 and the battery cell 9 on an upper side thereof. In particular, the two cooling plates 3 of the cooling fin 5 may be bent on the lower side of the unit over 8 to surround the lower side of the battery cell 9, thereby forming a rectangular parallelepiped as a whole.

Meanwhile, the lead tab fasteners 13 of the plurality of battery module units 15 overlapped to form the battery module 1 may include apertures 29 through which support bars 27 may be inserted through the battery module 1; end plates 31 may be disposed at both side ends of the battery module 1; and fastening elements 33 that penetrate through the end plates 31 and are coupled to the support bars 27 to integrally fix the battery module 1 may be provided. In other words, one battery module 1 forms one mechanically robust assembly by fastening the fastening elements 33 in a state in which the plurality of battery module units 15 are stacked between the two end plates 31 of both side ends thereof and all the battery module units 15 are penetrated by the support bars 27.

For the fastening elements 33, bolts or screws may be used. At this time, the use of a tool for fastening the fastening elements 33 such as the bolts or screws is required, but in this case, as a relative positional relationship of the plurality of battery cells 9 is already confirmed by the coupling structure by the lead tap fasteners 13, and the tool is used outside the end plates 31 at both ends, the risk of a safety accident may be considered as a significantly reduced condition.

A sensing assembly 35 configured to sense a voltage of each battery cell 9 may be installed at a portion where the lead tabs 7 of the battery module 1 are aligned. The sensing assembly 35 according to the present exemplary embodiment may include a plurality of cell connecting plates 37 for connecting between the lead tabs 7 of the battery cells 9; a plurality of insulating blocks 39 structurally providing electrical insulation between the plurality of cell connecting plates 37; and a printed circuit board (PCB) 41 connected to the cell connecting plates 37 to sense the voltages of the battery cells 9.

The plurality of cell connecting plates 37 may be formed to connect the lead tabs 7 of two battery cells 9 adjacent to each other; the plurality of insulating blocks 39 may be disposed along a stacking direction of the battery module units 15 while having the plurality of cell connecting plates 37 interposed therebetween; first ends of each of the insulating blocks 39 may be assembled to maintain a constant interval from each other by a frame plate 43; and second ends of the insulating blocks 39 may be assembled to maintain a constant interval from each other by the PCB 41.

The cell connecting plates 37 may include lead tab inserting apertures 45 into which the lead tabs 7 of two adjacent battery cells 9 are respectively inserted, and block coupling apertures 47 for being coupled to the insulating blocks 39; and the insulating blocks 39 may include connecting plate fixing protrusions 49 into which the block coupling apertures 47 may be inserted to fix the cell connecting plates 37. Therefore, when the block coupling apertures 47 of the cell connecting plate 37 are inserted into the connecting plate fixing protrusions 49 of the insulating blocks 39, the cell connecting plates 37 may be fixed to the insulating blocks 39. As a result, without using a separate tool, the cell connecting plates 37 may be fixed to the insulating blocks 39.

The lead tabs 7 of each battery cell 9 inserted into the lead tab inserting apertures 45 of the cell connecting plate 37 may be coupled to the cell connecting plates 37 by a method such as welding or the like, such that ultimately, all battery cells 9 forming one battery module 1 may be electrically connected to each other. The electrical connection of the battery cells 9 forming the battery module 1 may be performed in series or in parallel. For example, as illustrated in FIG. 1, in a state in which the battery cells 9 are disposed such that electrical polarities of the respective lead tabs 7 aligned on a first side of the battery module 1 alternately change, when the lead tabs 7 of two adjacent battery cells 9 are electrically connected by the cell connecting plates 37, and the lead tabs 7 of two adjacent battery cells 9 are similarly connected on a second side (e.g. an opposite side) of the battery module 1, a series connection of all battery cells 9 forming the battery module 1 may be configured.

For reference, two lead tabs 7 of the battery cells 9 of the two battery module units 15 adjacent to each other may be inserted into two lead tab inserting apertures 45 provided in the cell connecting plates 37, respectively, such that a series connection of the battery cells 9 forming the battery module 1 may be configured. Meanwhile, in a state in which the battery cells 9 are disposed such that lead tabs having the same polarity are located on a first side and a second side of the battery module 1, when the cell connecting plates 37 and the PCB 41 are used, a parallel connection of all the battery cells 9 may be configured.

Sensing protrusions 51 formed to be inserted into the PCB 41 may be integrally formed on the cell connecting plates 37 to electrically and mechanically connect the cell connecting plates 37 to the PCB 41. In other words, in a state in which the sensing protrusions 51 of the cell connecting plates 37 are inserted into the apertures or grooves formed in the PCB 41, when the cell connecting plates 37 are fixed to the PCB 41 by soldering or the like, the cell connecting plates 37 may be electrically connected to the PCB 41 and mechanically fixed thereto at the same time.

An electronic circuit configured to sense the voltage of each battery cell 9 through the sensing protrusions 51 of the cell connecting plates 37 connected as described above may be provided on the PCB 41, and the PCB 41 may include fuses 53 capable of electrically blocking each battery cell 9 in preparation for various short-circuits that may be caused by a collision of a vehicle or an external load and may include a connector 55 configured to communicate with a controller such as a battery management system (BMS).

Meanwhile, the insulating blocks 39 have a structure including free protrusion ends 57 capable of freely setting a height protruding between two adjacent cell connecting plates 37. In other words, the insulating blocks 39 may be formed in a shape in which the free protrusion ends 57 protrude along a direction in which the lead tabs 7 of the respective battery cells 9 protrude, from portions where the connecting plate fixing protrusions 49 for fixing the cell connecting plates 37 are formed. When a protruding height of the free protrusion end 57 is changed, an insulation distance between two adjacent cell connecting plates 37 may be structurally changed. Therefore, when a voltage of the battery system in which the battery module according to the present disclosure is used increases, the protruding height of the free protrusion end 57 of the insulating block 39 may be increased, thereby making it is possible to more easily respond to an increase in a required insulation distance.

In FIG. 1, lead tabs 7 of the battery cell 9 disposed on the outermost side of the battery module 1 may be inserted into module connecting plates 59 that may be electrically connected to other battery modules, and like the cell connecting plates 37, the module connecting plates 59 have a structure in which the block coupling apertures 47 inserted into the connecting plate fixing protrusions 49 formed on the insulating blocks 39 are formed. In addition, a sensing cover 61 for improving safety by wrapping and protecting the sensing assembly 35 configured as described above may be provided.

Figure 6:
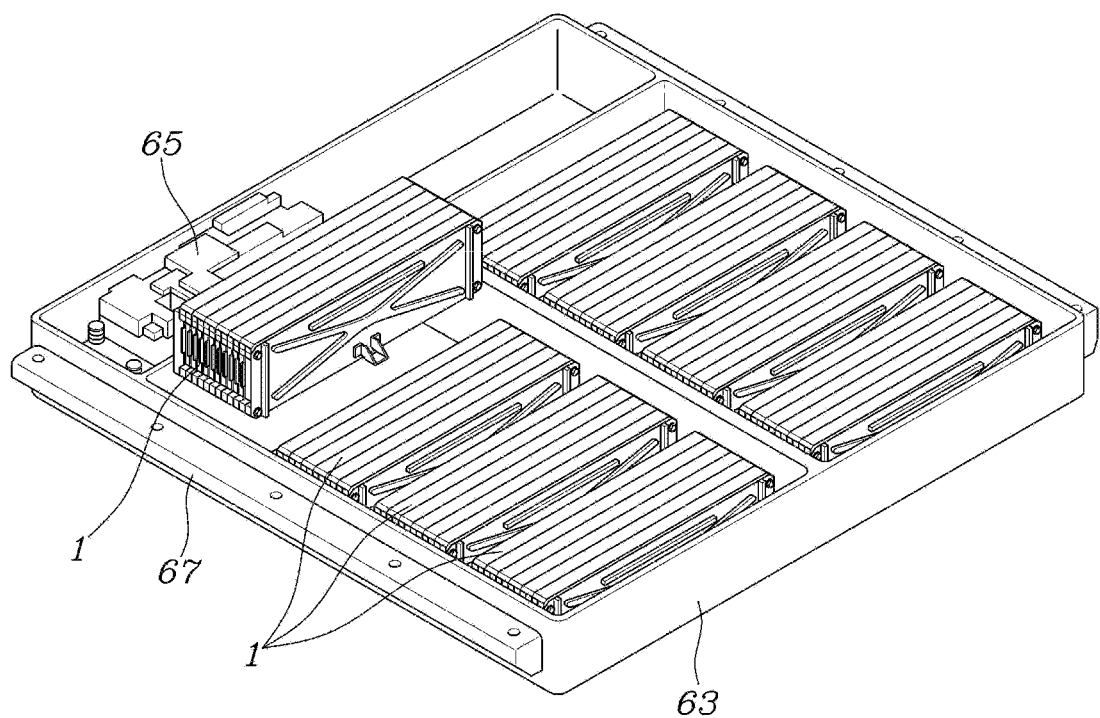
FIG. 6 is a view illustrating a battery system to which the battery module according to the present disclosure is applied.

For reference, FIG. 6 illustrates a battery system to which the battery module 1 according to the present disclosure is applied, and illustrates that a power relay assembly 65 may be provided together in a battery tray 63 loading a plurality of battery modules according to the present disclosure, and a mounting rail 67 for facilitating mounting of the battery tray 63 on the vehicle may be provided outside the battery tray 63.

According to the present disclosure, the battery module having simplified assemblability capable of cooling the lead tab, which is the main heat generating portion, together with the body of the battery cell, securing structural stability of the battery module by properly absorbing the swelling phenomenon of the battery cell, and constructing the battery module by more easily and safely coupling the plurality of battery cells may be provided.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A battery module, comprising:
a plurality of stacked battery module units, the battery module unit including:
a cooling fin in which an interval between two cooling plates facing each other is expandable and contractible;
a battery cell in contact with each of the two cooling plates and having lead tabs at each end of the battery cell;
protruding steps that extend from each end of the cooling plates to maximize a contact area with the lead tabs of the battery cell; and
lead tab fasteners coupled to the protruding steps to fix the lead tabs of the battery cell to the protruding steps,
wherein the lead tap fasteners include connecting grooves and connecting protrusions relative to each other to be coupled by a linear relative movement with lead tap fasteners of an adjacent battery module unit.

2. The battery module of claim 1, wherein the cooling fin is formed in a U-shaped cross-sectional structure formed by connecting first ends of the two cooling plates to each other.

3. The battery module of claim 2, wherein a deformation absorbing material that elastically contracts and expands when the interval between the two cooling plates is expanded and contracted is inserted between the two cooling plates of the cooling fin.

4. The battery module of claim 1, wherein coupling grooves and coupling protrusions are provided relative to each other between the lead tab fasteners and the protruding steps to press and couple the lead tap fasteners to the protruding steps.

5. The battery module of claim 4, wherein the coupling grooves and the coupling protrusions are formed to be pressed and coupled along a direction in which the battery module units overlap, and the connecting grooves and the connecting protrusions are configured to be fitted and coupled by the linear relative movement along a direction perpendicular to the direction in which the battery module units overlap.

6. The battery module of claim 1, wherein the lead tab fasteners of the plurality of battery module units overlapped to form the battery module include apertures through which support bars are inserted through the battery module, end plates are provided at both side ends of the battery module, and fastening elements that penetrate through the end plates and are coupled to the support bars to integrally fix the battery module are provided.

7. The battery module of claim 1, wherein a sensing assembly configured to sense a voltage of each battery cell is installed at a portion where the lead tabs of the battery module are aligned.

8. The battery module of claim 7, wherein the sensing assembly includes:
a plurality of cell connecting plates for connecting between the lead tabs of the battery cells;
a plurality of insulating blocks structurally providing electrical insulation between the plurality of cell connecting plates; and
a printed circuit board (PCB) connected to the cell connecting plates to sense the voltages of the battery cells.

9. The battery module of claim 8, wherein the cell connecting plates include lead tab inserting apertures into which the lead tabs of two adjacent battery cells are inserted, and block coupling apertures for being coupled to the insulating blocks; and the insulating blocks include connecting plate fixing protrusions into which the block coupling apertures are inserted to fix the cell connecting plates.

10. The battery module of claim 8, wherein sensing protrusions formed to be inserted into the PCB are integrally formed on the cell connecting plates to electrically and mechanically connect the cell connecting plates to the PCB.

11. The battery module of claim 8, wherein the insulating blocks include free protrusion ends that freely set a height protruding between two adjacent cell connecting plates.

12. The battery module of claim 8, wherein:
the plurality of cell connecting plates are formed to connect the lead tabs of two battery cells adjacent to each other,
the plurality of insulating blocks are disposed along a stacking direction of the battery module units while having the plurality of cell connecting plates interposed therebetween, first ends of the insulating blocks are assembled to maintain a constant interval from each other by a frame plate, and second ends of the insulating blocks are assembled to maintain a constant interval from each other by the PCB.

13. The battery module of claim 12, wherein the cell connecting plates include lead tab inserting apertures into which two lead tabs of the battery cells of two battery module units adjacent to each other are respectively inserted, and the lead tabs of the battery cell disposed on the outermost side of the battery module are inserted into module connecting plates that are electrically connected to other battery modules.

\* \* \* \* \*